United States Patent [19]

Soma et al.

[11] Patent Number: 4,625,919

[45] Date of Patent: Dec. 2, 1986

[54] ELECTROMAGNETIC FUEL INJECTION VALVE

[75] Inventors: Masahiro Soma; Takeshi Atago; Takayuki Kido, all of Katsuta, Japan

[73] Assignees: Hitachi, Ltd., Tokyo; Hitachi Automotive Engineering Co., Ltd., Ibaraki, both of Japan

[21] Appl. No.: 677,240

[22] Filed: Dec. 3, 1984

[30] Foreign Application Priority Data

Dec. 2, 1983 [JP] Japan ............................... 58-226904

[51] Int. Cl.[4] ............................................. F16K 31/06

[52] U.S. Cl. ................................ 239/585; 251/129.21

[58] Field of Search ................... 239/585; 251/129.21, 251/129.22, 139; 137/563, 881

[56] References Cited

U.S. PATENT DOCUMENTS

| | | | |
|---|---|---|---|
| 4,116,389 | 9/1978 | Furtah et al. | 239/585 |
| 4,281,681 | 8/1981 | Teague, Jr. et al. | 137/881 |
| 4,356,980 | 11/1982 | Krauss | 251/129.21 |

*Primary Examiner*—Joseph F. Peters, Jr.
*Assistant Examiner*—Scott Malpede
*Attorney, Agent, or Firm*—Antonelli, Terry & Wands

[57] ABSTRACT

In an electromagnetic fuel injection valve of the axial flow type, a tubular member with both its ends open is disposed in a penetration path that is formed in a stationary core, and an area is sealed between the outer periphery of the tubular member on the side of nozzle and the inner periphery of the penetration path. Further, the path formed between the tubular member and the penetration path is communicated with fuel space formed around the outer periphery of the stationary core. Therefore, the fuel circulates when it is allowed to flow out or flow in via the inner path of the tubular member.

7 Claims, 6 Drawing Figures

ELECTROMAGNETIC FUEL INJECTION VALVE

FIELD OF THE INVENTION

The present invention relates to an electromagnetic fuel injection valve employed for an electronically controlled fuel injection device that is used in internal combustion engines.

BACKGROUND OF THE INVENTION

In general, electromagnetic fuel injection valves have chiefly been of the axial flow type in which the fuel is supplied from the axial direction as has been disclosed in the specification of U.S. Pat. No. 3,967,597.

In an injection valve of the axial flow type, the fuel passes through a penetration path formed in a stationary core of the injection valve, and is injected from a nozzle portion.

In an injection valve of the axial flow type in which only one path leads to the nozzle portion, however, the fuel stays in the injection valve. Moreover, as electric current flows through a coil constituting the magnetic circuit, the fuel which remains is heated and bubbles are generated in the fuel. With an injection valve of the abovementioned construction, the bubbles are not allowed to escape; hence, vapor lock is likely to occur.

In recent years, therefore, it has been attempted to circulate the fuel, and there has been proposed an electromagnetic injection valve of the circulation type having a fuel outflow path as disclosed in West German Patent Laid-Open No. 3,013,007.

With the above-proposed injection valve, however, the fuel intake path and the fuel outflow path are provided independently of each other and in parallel with each other, with a consequent increase in size. Therefore, it is not feasible to mount fuel injection valves in the existing mounting space of the intake manifold on which the conventional injection valves of the axial type have been mounted.

Moreover, since such an injection valve has a structure which is greatly different from the conventional injection valve of the axial flow type, parts of the conventional injection valve of the axial flow type are not utilizable, and this increases production costs.

OBJECT OF THE INVENTION

The object of the present invention is to provide an electromagnetic fuel injection valve of the circulation type which can be mounted in the mounting space defined by the conventional intake manifold, and which permits the parts of the injection valve of the axial flow type to be used to a maximum degree.

SUMMARY OF THE INVENTION

The feature of the present invention resides in that a tubular member with both its ends open is disposed in a penetration path that is formed in the stationary core, an area is sealed between the outer periphery of the tubular member on the side of nozzle portion and the inner periphery of the penetration path, a path formed between the tubular member and the penetration path is hydraulically connected to a fuel space that is formed around the outer periphery of the stationary core via a connection hole formed in the stationary core, and fuel is allowed to flow out or flow in through the inner path of the tubular member, so that fuel is circulated.

According to the above-mentioned structure, a connecting hole is formed to connect the penetration path in the stationary core to the outer periphery of the stationary core, and the tubular member is simply disposed in the penetration path. Therefore, the outer shape is not substantially changed, and the injection valves can be mounted in the existing mounting space of the intake manifold. Further, most existing conventional parts can be utilized.

DETAILED DESCRIPTION OF THE INVENTION

Figure 1:
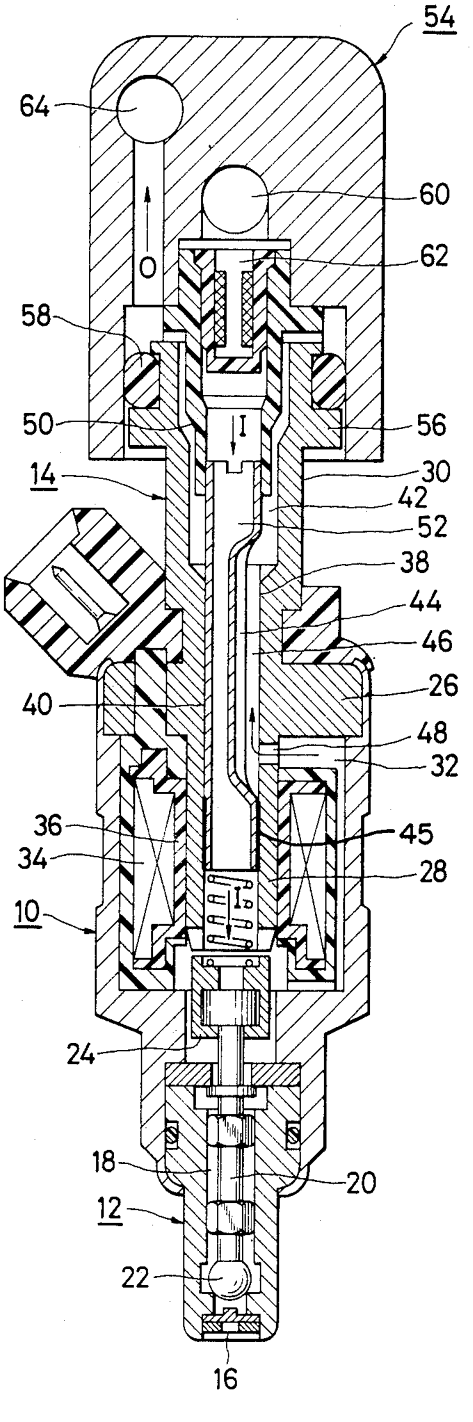
FIG. 1 is a section view of an electromagnetic fuel injection valve according to an embodiment of the present invention.

An embodiment of the invention will be described below in conjunction with the drawings. Reference numeral 10 denotes a housing which is made of a magnetic material and which has a valve guide 12 made of a non-magnetic material at one end thereof and a fuel guide member 14 made of a magnetic material at the other end thereof.

The valve guide 12 is fitted in an accommodation hole formed in the housing 10, and is secured therein by caulking. A fuel injection port 16 is open at the end of the valve guide 12. A guide hole 18 is formed in the valve guide 12, and a valve rod 20 is slidably fitted into the guide hole 18.

A ball valve 22 is secured to an end of the valve rod 20 which is opposite the fuel injection port 16, and a moving core 24 is secured to the other end of the valve rod 20.

The fuel guide member 14 has been formed in a cylindrical shape, and a portion 26 having a large-diameter formed therein is secured to the housing 10 by caulking. The cylindrical portion on one side of the large-diametered portion 26 serves as a stationary core 28, and the cylindrical portion on the other side serves as a connection portion 30.

The stationary core 28 is elongated, protruding into the housing 10, and an electromagnetic coil 34 is retained in an annular space 32 formed between the outer periphery of the stationary core 28 and the inner periphery of the housing 10.

The electromagnetic coil 34 is wound on a bobbin 36 which is secured to the outer periphery of the stationary core 28.

Figure 3:
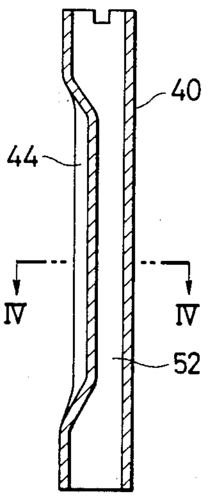
FIG. 3 is a sectional view along the line III—III of FIG. 2.
Figure 2:
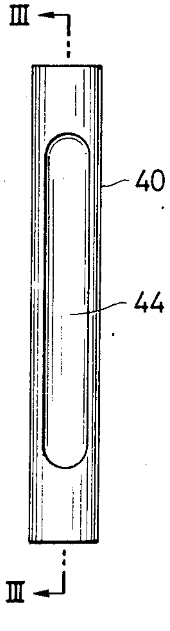
FIG. 2 is a front view of a tubular member.
Figure 4:
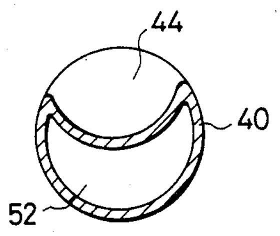
FIG. 4 is a sectional view along the line IV—IV of FIG. 3.

Further, a penetration path 38 through which the fuel will flow is formed from the stationary core 28 to the connection portion 30 in the axial direction of the fuel guide member 14, both ends of the penetration path 38 being open. In the penetration path 38 there is disposed a tubular member 40 which is shown in FIGS. 2 to 4. The tubular member 40 is made of stainless steel and has an outer diameter which is slightly larger than the inner diameter of the penetration path 38. Both ends of the tubular member 40 are open. The outer peripheral wall of the tubular member 40 at one end thereof is forcibly introduced inside the inner peripheral wall of the penetration path 38 near the stationary core 28, and is hydraulically sealed and is secured therein, at 45. However, the tubular member 40 may be secured therein based upon any other sealing means, instead of being forcibly introduced therein. The other end of the tubular member 40 forms an annular gap 42 near the connection portion 30 of the penetration path 38.

A groove 44 is formed in the tubular member 40 in the axial direction being inwardly retracted in the radial direction for a predetermined distance. A fuel outflow path 46 is formed between the groove 44 and the penetration path 38. The fuel outflow path 46 is connected to the annular space 32 in the housing 10 via a connection or fuel outflow hole 48 formed in the stationary core 28.

A connection tube 50 is connected to the end of the tubular member 40 on the side of the connection portion 30, and the fuel is sent into a fuel flow-in path 52 formed in the tubular member 40 flowing through the connection tube 50. The fuel is supplied as indicated by arrow I by connecting a fuel connection member 54 that also serves as a distributor pipe from the upper end of the connection portion 30. That is, the fuel connection member 54 is hydraulically sealed and secured via an O-shaped ring 58 that is held by a large diameter portion 56 of the connection portion 30, whereby a fuel supply path 60 is connected to the connection tube 50 via a filter, and a fuel return path 64 is connected to the fuel outflow path 46.

With the above-mentioned construction, the fuel pressurized by a fuel pump (not shown) flows through the fuel supply path 60 of the fuel connection member 54, and is sent into the fuel flow-in path 52 formed in the tubular member 40 via filter 62 and connection tube 50. The fuel is further sent to the guide hole 18 passing through the penetration path 38 formed in the stationary core 28. As the moving core 24 is attracted by the stationary core 28, the fuel is injected from the fuel injection port 16.

The excess fuel that was not injected passes through the outer periphery of the electromagnetic coil 34, passes through the fuel outflow opening 48 formed in the stationary core 28, and flows into the fuel outflow path 46 constituted by the tubular member 40 and the penetration path 38.

The fuel outflow path 46 is connected to the annular gap 42 which is constituted by the tubular member 40, connection tube 50 and penetration path 38. Therefore, the fuel flows into the fuel return path 64 formed in the fuel connection member 54 as indicated by arrow 0, and is returned to the fuel tank (not shown).

As described above, the present invention makes it possible to obtain an electromagnetic fuel injection valve of the circulation type by simply inserting the tubular member 40 in the conventional electromagnetic fuel injection valve of the axial flow type such as the one disclosed in the specification of the aforementioned U.S. Pat. No. 3,967,597, and by simply providing the fuel outflow hole 48. Furthermore, the fuel injection valve of the present invention can be directly mounted in the existing mounting space formed by the intake manifold, and enables most of the parts of the conventional injection valve to be commonly used.

According to the above-mentioned embodiment, the fuel intake path 52 is formed in the tubular member 40, and the fuel outflow path 46 is formed by the outer periphery of tubular member 40 and by the penetration path 38. These relations, however, may be reversed. In this case, the fuel supply path 60 and the fuel return path 64 in the fuel connection member 54 must be reversed correspondingly.

Figure 5:
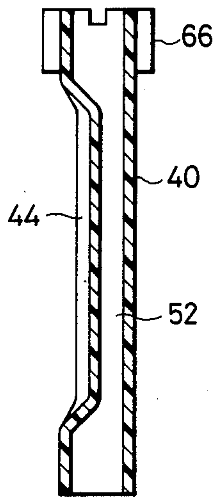
FIGS. 5 and 6 are sectional views showing tubular members according to modified embodiments.
Figure 6:
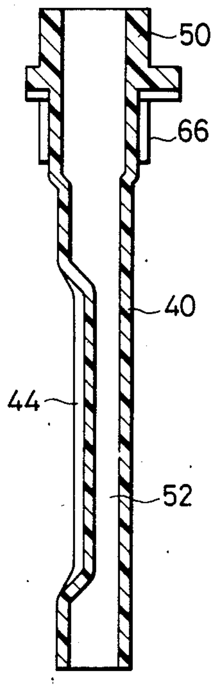

According to the above embodiment, furthermore, the tubular member 40 is made of metal. As shown in FIGS. 5 and 6, however, the tubular member 40 may be made of a synthetic resin.

In the case of FIG. 5, it is desired to form ribs 66 on the outer periphery at an end on the side opposite to the stationary core 28, so as to be supported by the inner peripheral wall of the penetration path 38. FIG. 6 shows the tubular member 40 having connection tube 50 formed as a unitary structure. In this case, also, it is desired to form ribs 66.

What is claimed is:

1. An electromagnetic fuel injection valve comprising:

(a) a housing made of a magnetic material;

(b) a valve which opens and closes a fuel injection port that is hydraulically connected to the interior of said housing;

(c) a moving core which drives said valve;

(d) a fuel guide member which consists of a large diameter portion that is secured to said housing on the side opposite to said fuel injection port, a stationary core which extends from said large diameter portion to protrude into said housing, a connection portion which extends from said large diameter portion to protrude toward the outer side of said housing, and a penetration path which extends from the protruding end of said stationary core to the protruding end of said connection portion;

(e) an electromagnetic coil disposed in an annular space defined by the outer periphery of said stationary core and the inner periphery of said housing;

(f) a tubular member which is disposed in said penetration path and which has openings at its both ends;

(g) sealing means which hydraulically seals the area between the outer periphery of said tubular member and the inner periphery of said penetration path at an end portion on the side of said fuel injection port of said tubular member; and (h) a connection hole which hydraulically connects said annular space to said penetration path on the side of said connection portion relative to said sealing means; wherein when the fuel is allowed to flow into said tubular member, the fuel flows in the path between said tubular member and said penetration path in a direction opposite to the flow of fuel in said tubular member, so that the fuel circulates.

2. An electromagnetic fuel injection valve according to claim 1, wherein said sealing means is established by forcibly inserting the outer peripheral wall of said tubular member into the inner peripheral wall of said penetration path.

3. An electromagnetic fuel injection valve according to claim 2, wherein a groove is formed in said tubular member in the axial direction from a portion where said tubular member is forcibly inserted into said penetration path to the side of said connection portion, said groove being inwardly retracted in the radial direction by a predetermined length, and wherein the fuel flows between said groove and said penetration path.

4. An electromagnetic fuel injection valve according to claim 3, wherein said tubular member is made of metal.

5. An electromagnetic fuel injection valve according to claim 3, wherein said tubular member is made of synthetic resin.

6. An electromagnetic fuel injection valve according to claim 5, wherein a plurality of ribs are formed on the outer periphery of said tubular member near said connection portion.

7. An electromagnetic fuel injection valve according to claim 5, wherein said tubular member and a connection tube are formed simultaneously as a unitary structure to flow the fuel into said tubular member.

* * * * *